(12) United States Patent
Hornor et al.

(10) Patent No.: US 10,368,201 B2
(45) Date of Patent: *Jul. 30, 2019

(54) PERSONAL MONITORING USING A REMOTE TIMER

(71) Applicant: Real Agent Guard-IP, LLC, Rogers, AR (US)

(72) Inventors: Justyn P. Hornor, Rogers, AR (US); Timothy S. Brasuell, Bella Vista, AR (US)

(73) Assignee: Real Agent Guard-IP, LLC, Rogers, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/256,121

(22) Filed: Sep. 2, 2016

(65) Prior Publication Data

US 2017/0238142 A1    Aug. 17, 2017

Related U.S. Application Data

(63) Continuation of application No. 14/933,952, filed on Nov. 5, 2015, now Pat. No. 9,438,682.

(60) Provisional application No. 62/075,497, filed on Nov. 5, 2014.

(51) Int. Cl.
| | | |
|---|---|---|
| *H04W 4/02* | (2018.01) | |
| *H04L 29/08* | (2006.01) | |
| *H04W 4/029* | (2018.01) | |
| *G08B 21/04* | (2006.01) | |

(52) U.S. Cl.
CPC ........ *H04W 4/029* (2018.02); *G08B 21/0415* (2013.01); *H04L 67/18* (2013.01); *H04L 67/22* (2013.01)

(58) Field of Classification Search
CPC .............................. H04W 4/028; H04L 67/22
See application file for complete search history.

(56) References Cited

U.S. PATENT DOCUMENTS

| | | | | |
|---|---|---|---|---|
| 4,727,368 A | * | 2/1988 | Larson | G07C 1/32 235/382 |
| 5,245,652 A | * | 9/1993 | Larson | G07C 1/32 235/382.5 |
| 5,602,536 A | * | 2/1997 | Henderson | G07C 1/32 340/5.23 |
| 6,509,830 B1 | | 1/2003 | Elliott | |
| 7,711,375 B2 | | 5/2010 | Liu | |

(Continued)

OTHER PUBLICATIONS

PCT International Search Report; dated Jan. 27, 2016; Applicant: Real Agent Guard-IP, LLC; PCT International Application No. PCT/US2015/059324; pp. 1-12.

*Primary Examiner* — Kostas J Katsikis

(74) *Attorney, Agent, or Firm* — Hall Estill Attorneys at Law

(57) ABSTRACT

Method and apparatus for monitoring the status and location of personnel using a remote timer. In some embodiments, a method includes logging in, through a network accessible device, a geo position of a subject to initiate a monitored session associated with the subject. A countdown timer of a remote server is initiated to denote a monitored time interval, the remote server in communication with the network accessible device over a network. A notification is generated and transmitted across the network to a monitoring device responsive to a conclusion of the monitored time interval.

10 Claims, 8 Drawing Sheets

(56) References Cited

U.S. PATENT DOCUMENTS

| | | |
|---|---|---|
| 7,801,506 B2 | 9/2010 | Haave et al. |
| 7,864,047 B2 | 1/2011 | Aninye et al. |
| 7,902,980 B2 | 3/2011 | Grimm |
| 8,487,757 B2 | 7/2013 | Culpepper et al. |
| 8,630,820 B2 * | 1/2014 | Amis ................ G01S 19/16 |
| | | 455/404.1 |
| 8,954,261 B2 | 2/2015 | Das et al. |
| 9,070,169 B2 | 6/2015 | Cherry et al. |
| 2002/0107927 A1 * | 8/2002 | Gallant ............ G08B 21/0423 |
| | | 709/206 |
| 2003/0034881 A1 * | 2/2003 | Linnett ............ G08B 25/016 |
| | | 340/309.16 |
| 2005/0068169 A1 * | 3/2005 | Copley ............ G08B 21/0283 |
| | | 340/539.13 |
| 2005/0070301 A1 | 3/2005 | Caspi et al. |
| 2007/0090921 A1 * | 4/2007 | Fisher ............ G07C 9/00103 |
| | | 340/5.73 |
| 2007/0233368 A1 * | 10/2007 | Friedmann ........... G03B 17/48 |
| | | 455/556.1 |
| 2008/0177646 A1 | 7/2008 | Frink |
| 2009/0309742 A1 | 12/2009 | Alexander et al. |
| 2010/0238033 A1 * | 9/2010 | Blumel ............ A61B 5/1112 |
| | | 340/573.4 |
| 2011/0046920 A1 * | 2/2011 | Amis ................ G01S 19/16 |
| | | 702/181 |
| 2011/0320372 A1 * | 12/2011 | Woodard ........... G06Q 50/16 |
| | | 705/313 |
| 2013/0109427 A1 | 5/2013 | Matus |
| 2013/0114849 A1 | 5/2013 | Pengelly et al. |
| 2013/0187756 A1 * | 7/2013 | Fisher ............ G07C 9/00571 |
| | | 340/5.61 |
| 2014/0118140 A1 * | 5/2014 | Amis ................ G08B 25/08 |
| | | 340/539.13 |
| 2014/0249877 A1 | 9/2014 | Hull et al. |
| 2014/0266586 A1 * | 9/2014 | Fisher ............ G08C 17/02 |
| | | 340/5.61 |
| 2014/0266721 A1 * | 9/2014 | Nickles ............ G08B 21/02 |
| | | 340/541 |
| 2014/0278594 A1 | 9/2014 | Vivadelli et al. |
| 2015/0186802 A1 * | 7/2015 | Hulbert ............ G06Q 10/02 |
| | | 705/5 |
| 2016/0071399 A1 * | 3/2016 | Altman ............ G10L 15/02 |
| | | 340/539.11 |
| 2016/0379479 A1 * | 12/2016 | Nepo ............ G08B 25/016 |
| | | 340/539.13 |
| 2017/0186307 A1 * | 6/2017 | Kim ................ G08B 25/016 |
| 2018/0182194 A1 * | 6/2018 | Schmidt-Lackner ................ G07C 9/00134 |
| 2018/0190049 A1 * | 7/2018 | Schmidt-Lackner ................ G07C 9/00007 |

* cited by examiner

PERSONAL MONITORING USING A REMOTE TIMER

RELATED APPLICATIONS

This application is a continuation of copending U.S. patent application Ser. No. 14/933,952 filed Nov. 5, 2015 which issues as U.S. Pat. No. 9,438,682 on Sep. 6, 2016, which claims the benefit under 35 U.S.C. 119(e) to U.S. Provisional Patent Application No. 62/075,497 filed Nov. 5, 2014, the contents of which are hereby incorporated by reference.

SUMMARY

The present disclosure generally relates to monitoring the status and location of personnel using a remote timer.

In some embodiments, a method includes logging in, through a network accessible device, a geo position of a subject to initiate a monitored session associated with the subject. A countdown timer of a remote server is initiated to denote a monitored time interval, the remote server in communication with the network accessible device over a network. A notification is generated and transmitted over the network to a monitoring device responsive to a conclusion of the monitored time interval.

In other embodiments, an apparatus includes a network accessible device comprising a memory that stores a subject application (app), and a programmable processor adapted to, upon execution of the subject app, operate to initiate a monitored session responsive to a user input to log into the subject app. A countdown server is provided in communication with the network accessible device over a network and comprising a countdown timer that initiates a monitored time interval responsive to the user input to log into the subject app. A notification server is provided in communication with the countdown server which generates a notification which is displayed on a monitor of a monitoring device connected to the network accessible device over the network responsive to a conclusion of the monitored time interval.

These and other features and aspects which characterize various embodiments of the present disclosure can be understood in view of the following detailed discussion and the accompanying drawings.

DETAILED DESCRIPTION

Figure 1:
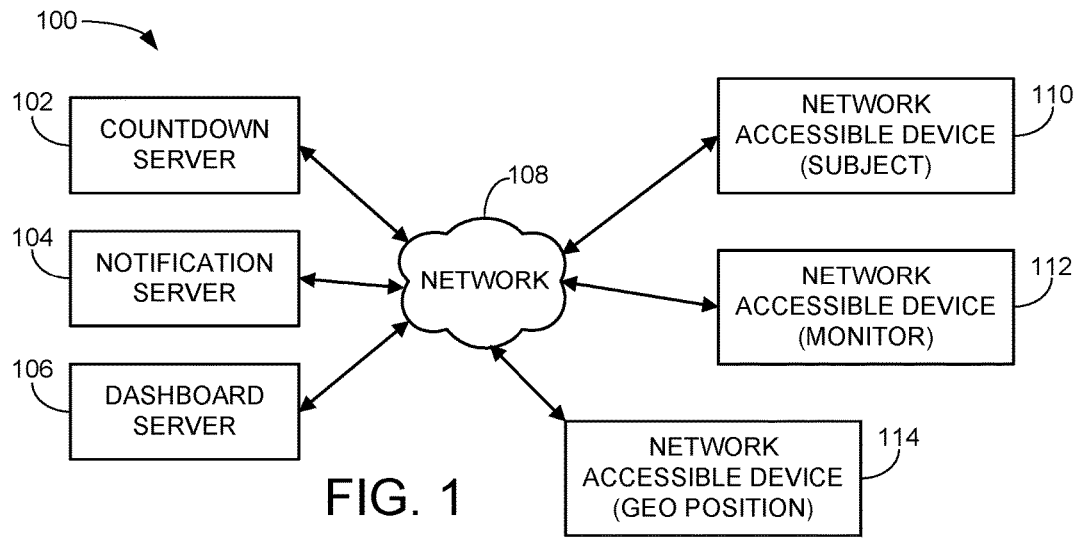
FIG. 1 provides a functional block diagram representation of a network-based system in accordance with various embodiments of the present disclosure.

The present disclosure generally a system and method for personal monitoring. The personal monitoring may be characterized as personal mobile monitoring through the use of a handheld portable network accessible device.

It is a fact of modern life that a person may be placed in a situation where the person needs to engage a potentially dangerous individual, group, situation, etc. The circumstances may be such that the person may have no one else around to help should the encounter escalate to a threatening or dangerous condition. For example, the person may be alone in an isolated setting situation or surrounded by people but not feel comfortable asking for assistance or otherwise getting help. The person may be a service provider, an elderly or physically infirmed individual, a child, etc.

The person may be safer through being monitored. In this way, if a problem arises, a response may be quickly available to help the person through the monitoring process that identifies a problem has occurred.

A number of personnel monitoring solutions have been proposed in the art. One limitation associated with such systems is the ability of an attacking party to disable or defeat the safeguards provided by such system.

Accordingly, various embodiments of the present disclosure are generally directed to an enhanced personnel monitoring system and methods for implementing the same. As explained below, in some embodiments a method includes logging in, through a network accessible device, a geo position of a person ("Subject") to initiate a monitored session associated with the Subject. A countdown timer of a remote server is initiated to denote a monitored time interval, the remote server in communication with the network accessible device over a network. A notification is generated and displayed on a monitor of a monitoring device connected to the network accessible device over the network responsive to a conclusion of the monitored time interval.

In this way, efforts to disable or damage the network accessible device will not interrupt the ongoing countdown of the monitored session. Moreover, a number of features are designed to identify whether the Subject is under duress (e.g., under the involuntary control of another), and to provide inputs to the system that trigger remote alarms and notifications that can be used to provide aid to the Subject.

System Overview

In order to provide a detailed discussion of various embodiments, it is believed that the following system overview will be helpful to explain overall concepts implemented by at least some of the embodiments disclosed herein. Following this system overview, particulars regarding various embodiments will be described in detail.

The system is generally arranged around an individual referred to herein as the "Subject," who represents the person being monitored during operation of the system. The Subject can be substantially any human being on the planet.

Examples set forth here will focus on individuals working in a commercial setting such as a real estate agent employed to engage in real estate transactions, but the various embodiments can be extended to substantially any human engaged in substantially any commercial or recreational endeavor including but not limited to elderly individuals, children, etc.

The term "Monitor" as used herein can refer to another individual, in most cases one located at a different location from the Subject, who is responsible for monitoring the Subject. In some cases, a physical human being operating as the "Monitor" is not necessarily required. Rather, the monitoring function can be fully automated using computerized systems in at least some embodiments. Therefore, while the term "Subject" implies a human being, the term "Monitor" does not although in many cases it will.

In personal monitoring in accordance with the present disclosure, a Subject is monitored over a monitoring period. The Subject may be monitored entering or leaving a designated geo position (e.g. a location on the earth). Such monitoring may continue until the person provides an appropriate authentication signature that, when processed, concludes the monitoring period. The Monitor, whether person or machine, will monitor the person throughout the monitoring period until the Subject provides the appropriate authentication signature or other exception or conclusion operation is enacted to conclude the monitoring period.

The system is arranged to issue notifications from time to time. A notification may be sent to the person, response personnel, etc. if the authentication signature is not provided within a specified time, the person leaves a specified proximity to the designated geo position, or another exception condition is detected.

In some embodiments, the system is arranged to commence a monitoring period in response to the Subject logging into the system. This may be carried out through an application software module (app) loaded onto and executed by a network accessible device of the Subject. The network accessible device can take a variety of forms, including but not limited to a smart phone, a tablet, a laptop computer, a game console, a personal data assistant (PDA) device, an e-book reader, or substantially any portable electronic device having processing and network communication capabilities. As explained below, the Subject logs into the system, and the system records a geo position of the Subject. The login process starts a countdown timer that runs until the Subject checks in with an authentication signature. When the Subject checks in with the authentication signature, the countdown timer is reset. The countdown timer is remote from the local network accessible device of the Subject, such as on a remote server, although a local countdown timer can also be initiated on the Subject's local device as well as desired.

The login of the Subject may be voluntary or involuntary. The login of the Subject may be an active process that requires subject intervention, or an automatic process that does not require subject intervention.

The authentication signature may include a personal identification (PID) which may include a sequence of numbers, alphabetic values, alphanumeric values, graphic images, biometric inputs, etc., or a combination of the above. In some cases, multiple PID values may be established. A first PID value (such as a "normal PID") may operate to enable and/or disable the system. One or more additional PID values (such as a "failsafe PID") may operate to look like a normal PID value but trigger notifications that the normal PID does not.

In at least some embodiments, entry of the normal PID value by the Subject arms and disarms the system and signifies a normal, safe environment. Entry of the one or more failsafe PID values, however, can be used to surreptitiously indicate an unsafe environment and trigger remote notifications that are not indicated on the local Subject device.

Should the Subject fail to check in within a predetermined time limit either at the end of the monitoring period or at selected checkpoints therein, the system may alert the Monitor monitoring the Subject and further actions may be taken designed to help ensure the safety of the Subject.

The system and method disclosed may reduce the response time should the Subject become injured, incapacitated, assaulted, threatened, kidnapped, etc. in the normal course of their activities. The faster response time may make it more likely to find the Subject, provide help to the Subject, etc.

Various embodiments of the present disclosure arrange the system around several components, including a so-called Agent app, Monitor app, Dashboard app, server, and network accessible device.

An Agent app, also known as the Subject app, is an application that the Subject can install on a network accessible device (e.g., smart phone, tablet, laptop, e-reader, desktop computer, custom-built dedicated device, etc.). Of course, the Agent app may be pre-installed on the network accessible device at some time before Subject has the network accessible device, such as during manufacture. The Agent app may form a portion of the native programming of the device, such as a feature of an operating system thereof, or may be separately installable and uninstallable.

The Subject can go to a geo position, such as where the real estate agent intends to show a property. The Subject can login to the system for personal monitoring through the Agent app. The system may record characteristics of the Subject and the situation to facilitate monitoring, such as, the geo position, the time, the date, name, phone number, etc. The Subject may provide further information, such as photographs, which may be taken with the network accessible device or other suitable device. Of course, photographs and other information could be taken automatically. The photographs could include pictures of a client, a car license plate of the client, location, etc. Once the Subject is logged into the system, the Subject uses an authentication signature to logout of the system or reset the countdown timer.

An authentication process entails setting the PID value(s) for the Subject app. As noted above, these can be a series of numbers, alphanumerics, letters, graphics, biometric inputs, etc. or a combination of these or other characteristics. The Subject uses the PID value as the authentication signature to reset the countdown timer or logout of the system. By using a PID value that only the Subject knows, the system may have a safeguard against an assailant, or an accidental, logging out the Subject from the system.

In the event that the Subject misses a time for check in, the Monitor is notified through the system. The Monitor app may display an alert, and the Monitor can interact with the alert to get in contact with the Subject or see the geo position of the Subject.

The Monitor should respond to notification in an appropriate manner. For example, the Monitor may immediately try to contact the Subject to ascertain whether the Subject is safe. The contact may be a phone call, text message, etc. If the Subject does not respond to the Monitor in an appropriate fashion, the Monitor may notify appropriate authorities, go to the last known geo position of the Subject, etc. Other protocols, such as immediately notifying emergency medical services, police, fire, etc. are envisioned.

A Monitor app is an application that the Monitor can install on a network accessible device (e.g., smart phone, tablet, laptop, e-reader, desktop computer, custom-built dedicated device, etc.). The Monitor app allows the Monitor to monitor one or more Subjects. In addition, each Subject may be monitored by one or more Monitors. The server may provide push notification to the Monitor app should the Subject missed a check-in with authentication signature. The Monitor app may allow the Monitor to open the Monitor app and perform several activities on the Monitor app.

One of the activities that the Monitor app may facilitate is the Monitor contacting the Subject. For example, the Monitor may establish contact with the Subject through a phone call, text message, email, etc. If the Monitor finds the Subject is safe, the Monitor could encourage the Subject to reset the countdown timer or logout of the geo position. If the Monitor finds the Subject is not safe, the Monitor could respond appropriately by sending emergency services, police, fire, etc.

Through the Monitor app, the Monitor can also logout the Subject from the system, reset the countdown timer of the Subject in the system, or see the geo position of the Subject, such as on a mapping service, among other possibilities. The geo position may be a last known location, or any recent geo position associated with the Subject.

The system logout and reset countdown timer capabilities of the Monitor app are features that may make management of the system easier, but these features may open potential security breaches in the system. Therefore, the system may log, or record, the Monitor who logs the Subject out of the system or resets the countdown timer of the Subject, for example. The log can provide forensic information. In other words, the system will record if the Subject has logged the Subject out of the system or if the Monitor has logged the Subject out of the system. This information may be useful in the event of an investigation into the circumstances of the logout or reset.

A Dashboard app, also known as a personal monitoring app, is an application that may provide similar functionality to the Monitor app. The Dashboard app may be considered a customer facing solution. The Dashboard app may be a web-based application. The Dashboard app may be served at a domain name that is a specifically dedicated setup for the combination of the Subject and the Monitor (e.g., real estate agents at one real estate broker), or the Dashboard app may be served at a domain name that is generally setup to manage any combination of the Subject and the Monitor. Depending on the requirements of a given application, the Dashboard app may be accessible by the Subject, the Monitor, or another third party separate from the Subject and the Monitor.

The Dashboard app may have similar functionality to the Monitor app. For example, user of the Dashboard app can log out the Subject from the system, reset the countdown timer of the Subject, and record the geo position of the Subject, such as on a mapping service. The geo position may be a last known location or a recent location.

After a user has decided to use the system, the user can contact a provider of the system to sign up for the service. The service may be available through a website. Once the user has signed up for the system and made appropriate payment arrangements, if required, the user may have access to the Dashboard app. The Dashboard may contain one or more API Keys that the user of the Dashboard app may distribute for use on the network accessible device of the Subject in the field, and on the network accessible device of the Monitor that will be monitoring the Subject.

The Subject may download the Subject app on to the network accessible device of the Subject, through an appropriate online application service, such as iTunes Store (iOS), App Store (OS X), Apps & Window store (Windows), Google Play (Android), by way of example and not limitation. (Any trademarks used are the property of the respective owners.) Of course, the Subject app could be downloaded onto the network accessible device through a physical connection, such as a cable. Similarly, the Monitor downloads the Monitor app on to the network accessible device of the Monitor. Of course this downloading process could be automated, provided by the manufacturer of the network accessible device as preinstallation software, etc.

After the Subject app is installed, the Subject can enter personal contact information, such as name, phone number, and PID value(s). In addition, the Subject should enter the API Key obtained from the Dashboard app into the Subject app before the Subject logs into a geo position. In the login process, the network accessible device communicates with the server to verify that an API (application programming interface) Key is registered in the system. If the API Key is not registered in the system, login through the Subject app is not allowed. The login through the Subject app is not allowed, because there would be no Monitor for the Subject, due to there being no API Key registered in the system.

After the Monitor app is installed, the Monitor can enter the API Key into the Monitor app. Each network accessible device in the system has a unique API Key. In addition, the Monitor enters a Monitor ID that can also be provided from the Dashboard app. The Monitor ID can be used to prevent the Subject from downloading the Monitor app and using the Monitor app to monitor another Subject without permission.

In the system, a flow of data can start with the Agent app. The data flow can be triggered by the Subject logging into a geo position. When the Subject logs into a geo position, the Subject app can send data to a server, such as a web server. The data may include the name of the Subject, the phone number of the Subject, and geo position (e.g., longitude and latitude). The geo position may be displayed via a suitable map graphic.

After the server receives the data from the Agent app, the server is aware of the geo position of the network accessible device of the Subject, and the time that the Subject arrived at the geo position. The server can then manage the countdown timer process. By having the server manage the countdown timer, it may not matter what happens to the Subject or the network accessible device of the Subject, because the countdown timer can continue to run until the Subject or the Monitor manually resets the timer or logs out the Subject from the system.

The server may run two processes to manage the countdown timer. The two processes may include push notifications and push management. Regarding push notifications to the Monitor app and the Dashboard app, the server may search all sessions (a session is an instance of the Subject logged into the system at a geo position) at predetermined intervals. The intervals may be the same length of time between intervals (e.g., two seconds) or of a variable length of time between intervals. The server may compare the time that each session was created with the amount of time in the countdown timer associated with the session. In the event that the countdown timer has not already expired, then the server does nothing regarding that session during that interval.

If the countdown timer has expired, then the server can check to see if a push notification has been sent to the Monitor app associated with the Subject whose countdown timer has expired. A token that is unique to the Subject app can be used to send push notifications from the server. The token may forwarded from the server to a server associated with the network accessible device, e.g., Apple servers for Apple devices, Android servers for Android devices, and Windows servers for Windows devices, by way of example and not limitation. The server associated with the network accessible device then pushes the notification to the network accessible device with the Monitor App. The token can be stored and paired to an API Key, which allows one-to-one push notifications or one-to-many push notifications. In this case, it's one Agent to one/many Monitors.

If no push notification has been sent to the Monitor app, a push notification is sent to the Monitor app associated with the Subject whose countdown timer has expired. More than one Monitor app may receive the push notification. The API Key of Monitor app or Monitor apps that receives the push notification is recorded. If a push notification has previously been sent to the Monitor app in a previous interval, then the server does not need to do anything in that interval. Or the server may send another push notification to the Monitor app, if the server has not received notification, such as from the Monitor app or the Dashboard app, that the push notification has been dealt with in an appropriate manner.

In push management, a push manager, or sweeper, can determine if there are API Keys present in the system. If there are API Keys present in the system, than the push manager checks to see if the countdown timer associated with the API Key is still expired. If the countdown timer is still expired, then the server can do nothing. Or the server may send another notification, if the server has not received notification, such as from the Monitor app or the Dashboard app, that the push notification has been dealt with in an appropriate manner. If the countdown timer is no longer expired, then API Keys may be deleted from the system. In this scenario, the Subject has simply missed check in authentication, but the Subject is under no threat or is otherwise safe.

The Monitor App and Dashboard app may for the most part be identical in their functionality. The Monitor App and Dashboard app, when open (the Monitor App on the device, the Dashboard app in a web browser) look for active (logged in) sessions and display basic information on the screen for the user of the Dashboard app or the Monitor app. The Monitor app in the Dashboard app may provide an opportunity to interact with the Subject app to determine geo position and safety of the Subject through the Subject app.

Indicia such as good indicia, caution indicia, and bad indicia can be used to make the applications more user-friendly. For example, good indicia may present application screens with the background that is green, caution indicia may present application screens with the background that is yellow, and bad indicia may present application screens with the background that is red.

The real estate situation provides further opportunities in the system. The real estate agent is typically going to a known location, which could be characterized as a designated geo position, that may have real estate agency associated items present at the location, which can be known as a network accessible device of a geo position. The real estate agency associated items may include a lockbox for keys and a yard sign. The lockbox or the yard sign may be configured with a network accessible device, such as a wireless transmitter and receiver. The technologies used in the real estate agency network accessible device at the location may be Bluetooth, infrared, etc. The real estate agency associated devices may automatically log in the real estate agent into the system when the real estate agent enters within a certain proximity of the designated geo position. In addition, the real estate agency associated device may push a notification to the server that goes through the system to the Monitor app or Dashboard app if the real estate agent leaves a predetermined proximity from the real estate agency associated device. The real estate agency associated device may be powered by battery, solar, mains, etc. The real estate agent could provide an itinerary that is loaded into the system for monitoring. Such information may speed up a response, should the real estate agent counter a dangerous situation.

The data from the known geo locations, also known herein as geo positions, from logged in agents may be aggregated to produce information products sold to third parties.

Discussion of Embodiments

In view of the foregoing system overview, reference is now made to FIG. 1 which is a functional block diagram of a personnel monitoring system 100 constructed and operated in accordance with various embodiments. The system 100 can take a number of desired forms depending on the requirements of a given application, so the representation set forth in FIG. 1 and in the subsequent drawings are merely for purposes of providing a concrete example and are not limiting.

As noted above, the present discussion will be provided in the context of the Subject being monitored is a real estate agent, whose duties include traveling alone to various real estate properties to meet with unknown parties in hopes of potentially concluding a real estate transaction. Because of the potential dangers involved with meeting individuals in remote locations (such as vacant houses for sale) which could expose the agents to various significant risks such as assaults, abductions, etc., the system 100 is configured to mitigate such risks by providing some measure of monitoring protection for the Subject.

Obviously, no system can completely ensure the safety of an individual, but it has been found that the system 100 as embodied herein can provide both a deterrent affect against such attacks as well as providing real time monitoring and response characteristics that can reduce such risks to a manageable level. Commercially implemented systems generally conforming to the various embodiments disclosed herein have already been found by the inventors to have been successful in detecting medical emergencies involving the incapacitation of Subjects and rendering them timely medical treatment.

The system 100 of FIG. 1 includes various elements including a so-called countdown server 102, a notification server 104 and a dashboard server 106. Each of these servers can be separate servers (e.g., operational modules having processing and memory capabilities) which are geographically distributed or a single combined hardware/software platform with different programming modules executed by one or more programmable processors to carry out the functional processes discussed herein.

The servers 102, 104 and 106 communicate over a network 108, which can take a variety of forms including a local area network (LAN), a wide area network (WAN), the Internet, a private network, satellite communication networks, etc. Aspects of the network 108 can be hardwired and/or wireless depending on the requirements of a given application.

Attached to the network 108 are a number of operational blocks including a first network accessible device (NAD) 110 associated with a Subject, a second NAD 112 associated with a Monitor, and a third NAD 114 used to provide geo position data (e.g., coordinate data associated with a physical location on the earth). In some embodiments, the geo positioning functions supplied by NAD 114 can be incorporated into the Subject NAD 110, such as smart phone capabilities of the Subject smart phone. In other embodiments, the NAD 114 is a separate geo positioning device that can be hidden on the Subject's person, such as well-known geotracking modules (e.g., global positioning modules, or GPM modules) that can constitute small receiving and transmitting devices that can be hidden on a person to provide GPS (global positioning system) capabilities.

Thus, in some embodiments, the modules 110, 114 constitute a smart phone or other portable device carried by the Subject, and in other embodiments the module 110 is a smart phone carried by the Subject and the module 114 is a hidden module worn or otherwise carried by the Subject. The module 112 is a separate device utilized by the Monitor tasked with tracking the location and status of the Subject. If a separate GPM device is used, the GPM device may be operated in a standby mode and not activated unless and until an exception condition is detected involving the Subject device, as explained below.

Figure 2:
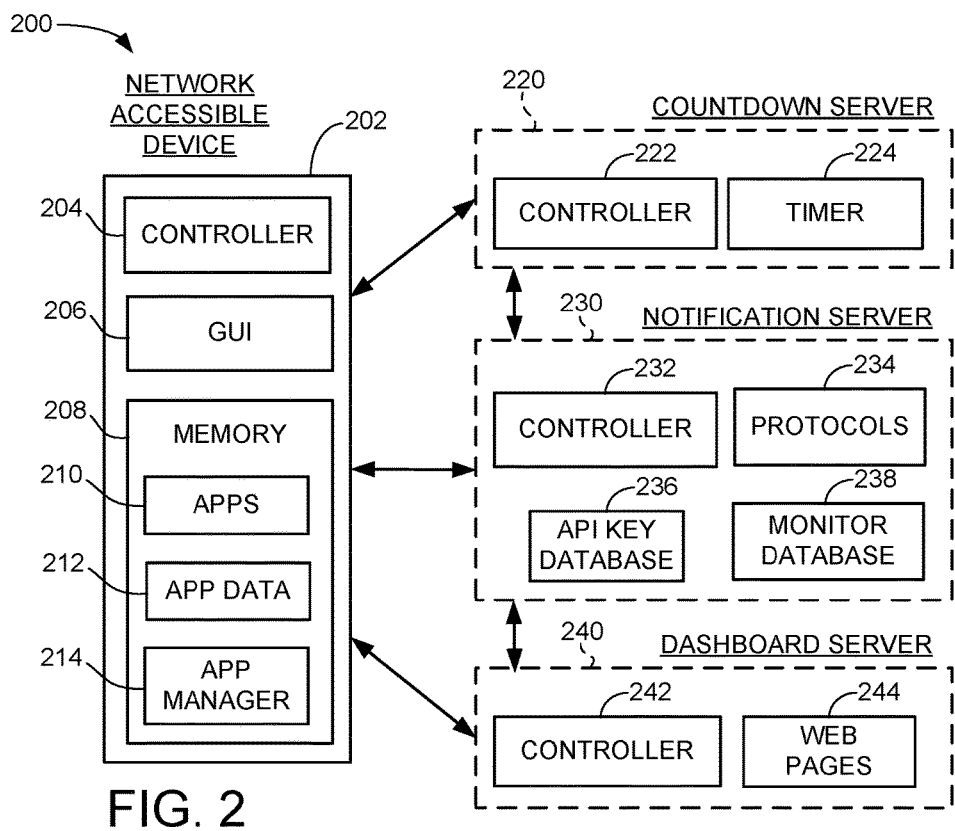
FIG. 2 provides another functional block diagram representation of the network-based system in accordance with various embodiments of the present disclosure.

FIG. 2 is a functional block representation of a system 200 with various operative elements generally corresponding to those set forth in the system 100 of FIG. 1. The system 200 includes a network accessible device (NAD) 202 carried by the Subject. As noted above, the NAD 202 may be a smart phone or other portable electronic device with network communication capabilities.

The NAD 202 includes a controller 204 ("control circuit"), which constitutes a programmable processor and/or a hardware processor. In the case of a programmable processor, the circuit constitutes microcontroller circuitry and other operative electronic elements configured to execute programming instructions stored in a suitable memory location. In the case of a hardware processor, the circuit may be a field programmable gate array (FPGA) or application specific integrated circuit (ASIC) that provides system on chip (SOC) capabilities to carry out various functions described herein.

A graphical user interface (GUI) is represented at 206. The GUI provides input/output/display capabilities to enable the user to interact with the device 202. Such elements may include a touch screen, user depressible buttons, key pads, pointer mechanisms, etc.

A memory 208 stores various executable routines in the form of programming including applications (apps) 210, app data 212 and an app manager 214. The apps 210 can take a variety of forms and include the Subject app discussed in greater detail below. The app data 212 provide parameters and other control data associated with the apps 210. The app manager 214 manages downloads and communications involving the apps 210.

A countdown server is represented at 220 and is in communication with the NAD 202 via a suitable network. The server 220 includes a controller 222 (control circuit) and a timer 224. As with the NAD 202, the controller 222 can be realized in hardware, firmware and/or software as a hardware or programmable processor. The timer 224 can be a firmware/software module executed by the controller 222 or a separate hardwired circuit, such as a counter circuit, etc. The timer circuit 224 may be configured to manage multiple concurrent timing intervals for the same Subject or for multiple Subjects.

A notification (push) server 230 communicates with the countdown server 220 and the NAD 202, and includes elements including controller (control circuit) 232, various protocols 234, an application programming interface (API) database 236 and a monitor database 238. The latter elements 234, 236 and 238 may form data structures and programming steps stored in a suitable memory location. In some embodiments, both the countdown server 220 and the notification server 230 are realized in the same remote server chassis so that one or more processors execute both the countdown and notification functions described herein. In other embodiments, the respective servers 220 and 230 are separate servers, including servers in chassis elements in geographically distributed locations (such as different data centers, processing locations, etc.). In still other embodiments the respective servers can be embodied in other forms of devices apart from "traditional" servers, such as another network accessible device of a peer. For example, the Monitor NAD could also double as one or more of the remote servers, with the server applications "pushing" the notifications to the Monitor app on the same device, etc.

As explained herein, the notification server 230 handles various protocols established by the system including verification and authentication and generation of appropriate notifications based on inputs supplied by the NAD 202 and the countdown server 220.

A dashboard server 240 communicates with the servers 220, 230 and the NAD 202. The dashboard server 240 also includes a controller 242 (control circuit) and various web pages 244 in local memory to display current status aspects of the system to authorized devices. As before, the server 240 can be incorporated into the same chassis as the server 220 and/or server 230, or can be a standalone device.

Figure 3:
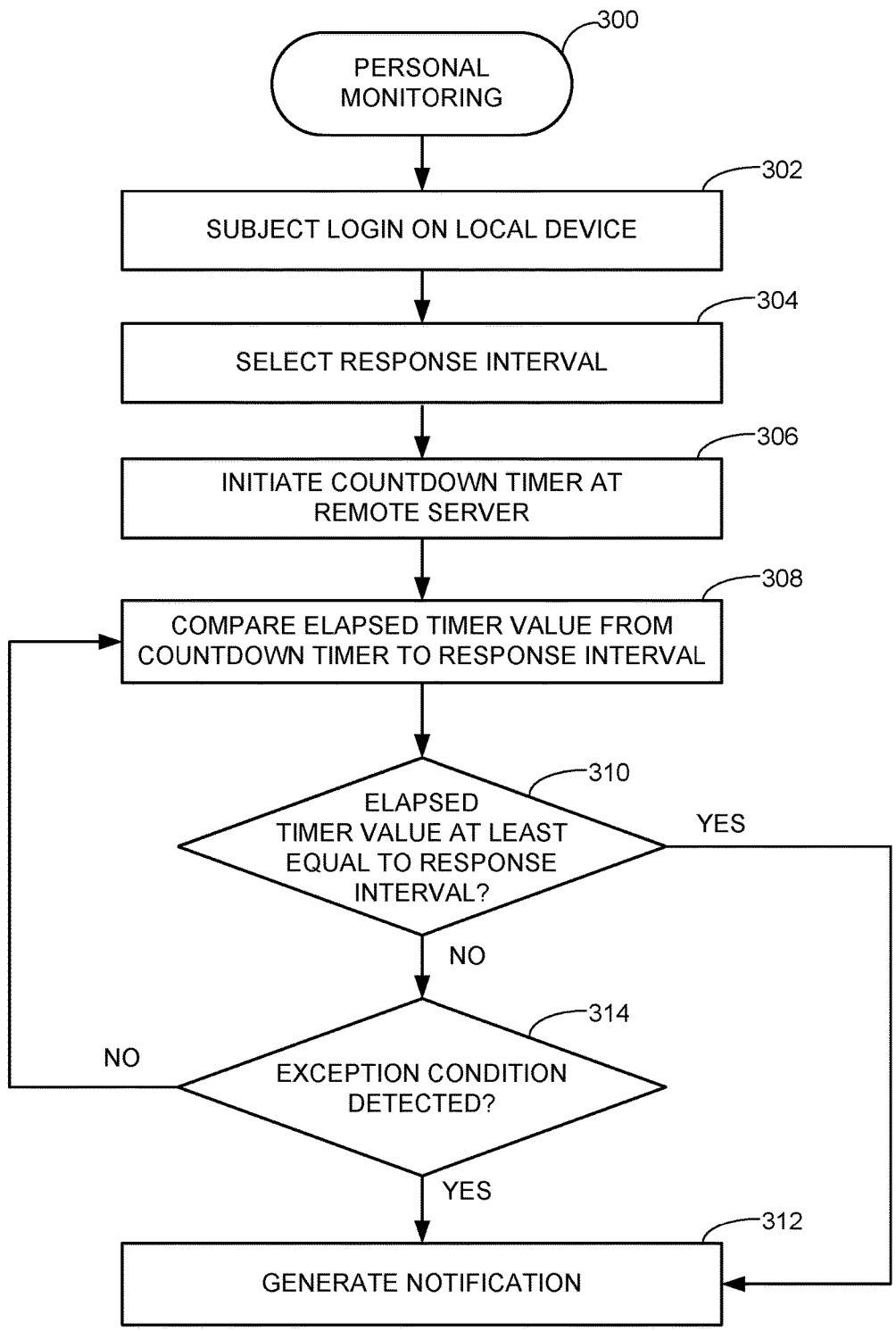
FIG. 3 is a flow chart of the method of personal monitoring in accordance with some embodiments of the present disclosure.

FIG. 3 shows a simplified flow chart for a personnel monitoring routine 300 carried out by the systems 100, 200 of FIGS. 1-2 in accordance with various embodiments. The various steps shown in FIG. 3 may represent programming or other circuit capabilities carried out by the various control circuits of the NAD and server devices. It will be appreciated that the flow chart is merely exemplary and that other steps can be carried out as required depending on the configuration of the system and the needs of the selected operational environment.

As shown by step 302, a monitoring session is initiated for a selected Subject. This may be carried out by the Subject initiating a login operation on a local device, such as the NAD 202 in FIG. 2. The operation activates the Subject app on the local device, which communicates with the countdown server 220 to establish initiation of the session.

A suitable response interval is selected at step 304. This may be selectable at the Subject app level or at the countdown server level. If user activated, increments may be selectable by the Subject on the NAD 202 based on an estimate of how long the interval should be. For example, in the case of the Subject being a real estate agent meeting a prospective client at a real estate property, the Subject may select a suitable time interval, such as 30 or 45 minutes, which should be suitable to conclude the meeting. Substantially any length interval can be selected, including multi-hour or even multi-day intervals.

In other embodiments, the response interval may be selected at the server level, either based on preexisting criteria or other selection by the Monitor or other control personnel. Indeed, initiation of the entire monitoring session may be carried out independently of the Subject at the server level (or via a user of a network accessible device Interfacing with such servers).

A countdown timer is initiated at step 306 based on the selected response interval from step 304. This may be carried out in FIG. 2 by operation of the controller 222 initiating the timer circuit 224. While the term "countdown" is employed it will be appreciated that the actual counting methodology (e.g., counting "down" or counting "up") is not important, so long as an elapsed time interval is initiated or otherwise demarcated based on the response interval. For purposes of the present discussion, it will be presumed that the interval is set at 30 minutes, and so step 306 begins operation to mark the passage of this amount of time.

While the remote server countdown is carried out at the countdown server level, one or more additional system counts can be maintained elsewhere as well, including redundant remote server or device counts for purposes of reliability. In further cases, a separate (or reported) count can be maintained on the local Subject device (e.g., NAD 202).

Periodically, the system checks to determine whether the response interval has lapsed. This is indicated by steps 308 and 310. If so, the flow passes to step 312 where a suitable notification is sent to one or more devices. For example, should the timer 224 reach "zero" or other count value indicating cessation of the monitored session duration (response interval), a notification is sent to the Subject device with a message indicating that the time of the monitored session has lapsed. In some cases, an affirmative response from the Subject device (e.g., NAD 202) is required to complete the session. This may include entry of a specific personal identification (PID) value by the Subject, which results in an "all clear" message being returned to the notification server. On the other hand, a lack of response or the entry of a failsafe PID value may result in other actions being taken as discussed herein.

Continuing with the flow of FIG. 3, should the session still be in place, decision step 314 determines whether an exception condition has been detected. Example exception conditions will be discussed below, but at this point it will be understood that an exception condition will at a minimum result in the generation of one or more notifications at step 312. Any number of exception conditions can be defined depending on the requirements of a given application, including unexpected movement of the Subject away from the location (geo position) of the meeting beyond a permissible boundary distance, entry of a failsafe PID or other panic alert by the Subject, accelerometer readings sensed by the Subject device or other devices indicating sudden acceleration/deceleration events, etc. Depending on the type of detected condition, the notification can range from a simple attempt to contact the Subject, notification of the Monitor or other device, etc. In some cases, depending on the severity, emergency personnel may be contacted for mobilization.

Display Screen Configurations

FIGS. 4-6B generally set forth various displays (screen shots) representative of rudimentary informational arrangements that may be displayed on various devices during the operation of the routine of FIG. 3. It will be appreciated that the actual arrangement and types of information can vary so that the figures are merely exemplary and are not limiting.

Figure 4:
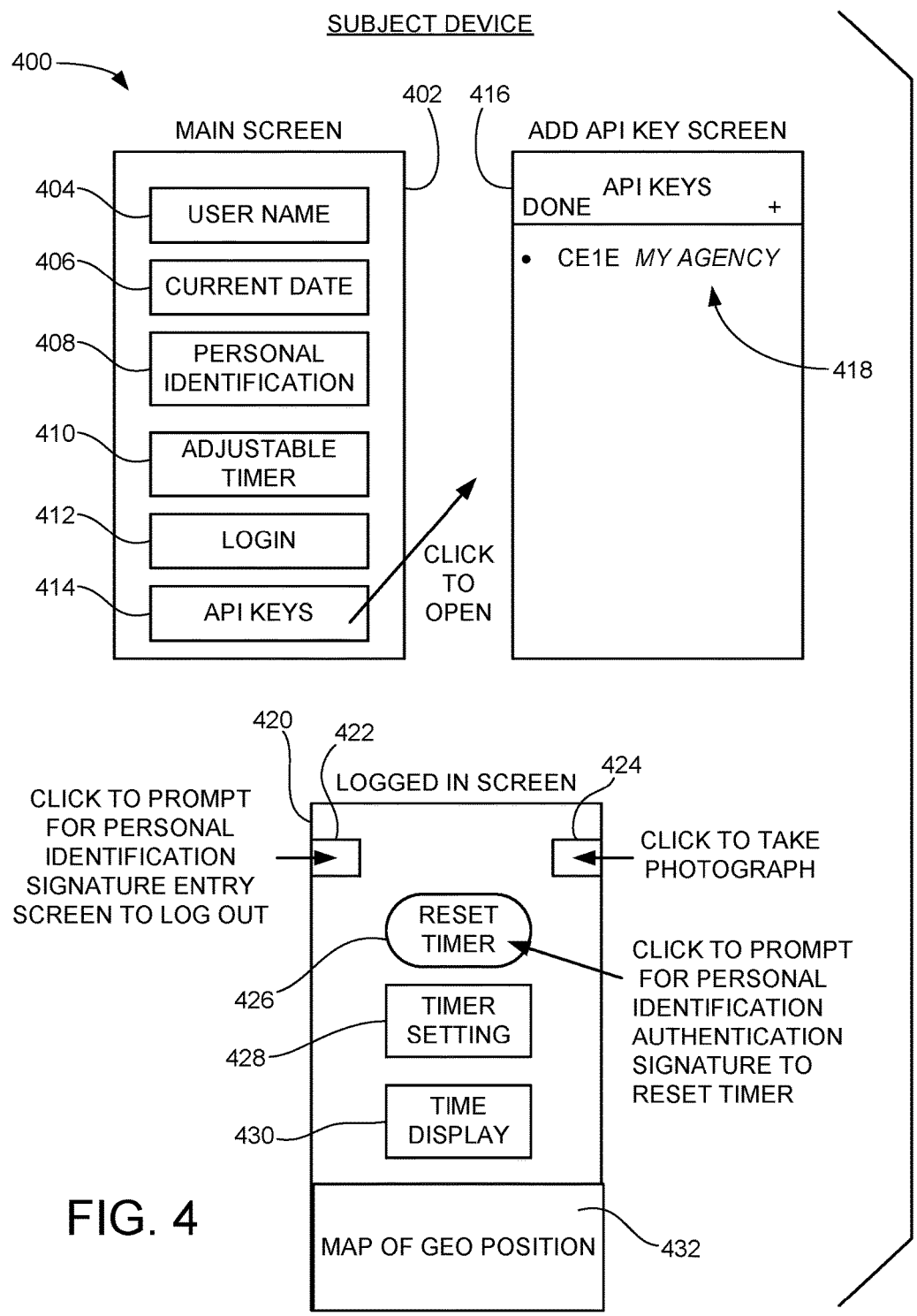
FIG. 4 provides a functional block diagram of a Subject app in accordance with various embodiments of the present disclosure.

FIG. 4 shows various displays 400 that may be provided on the Subject device (e.g., NAD 202) by the Subject app. A main screen is depicted at 402 with various information fields including user name 404, current date 406, personal identification 408, adjustable timer 410, login 412 and API keys 414. In some cases, user activation of the fields will transition to other fields, such as shown by activation of the API keys field 414 resulting in the display of an API keys screen 416.

The API keys screen 416 allows the Subject to manage various public API keys, such as a main key "CE1E" for "My Agency." As discussed above, the API keys enable the system to uniquely identify the Subject to the system and grant access to various functions, such as the Dashboard server output. In some cases, display of this page may be restricted, or omitted altogether at the device level since the API keys may be assigned by the system. On the other hand, the page 416 allows the Subject to select among various API keys under different circumstances, and different protocols may be applied based on the selected API key.

FIG. 4 further shows a screen 420 resulting from selection of the login field 412 to enable the Subject to log into the system and initiate a monitored session. The arrangement of the screen can vary, but selectable fields can include a PID entry field 422, a camera field 424, a reset timer field 426, a timer setting field 428, a time display field 430 and a map field 432.

The PID entry field 422 can be selected by the user to enable the Subject to enter an appropriate PID value (such as a normal or failsafe value). The camera field 424 is a convenient field to enable camera equipped devices to quickly take a photo, as circumstances warrant (e.g., to capture an image of an assailant, a license tag, etc.). The reset timer field 426 enables the Subject to change the existing interval to another level, such as to increase the amount due to a meeting going longer than expected or to shorten the existing interval. The time setting field 428 can be used to enable the Subject to set (or adjust) the response interval, and the field 430 provides a count of the existing interval.

It is contemplated that changes to the time interval such as through fields 426, 428 and 430 require entry of a PID value from the Subject. In each case, changes are relayed by the NAD 202 to the countdown server 220 and/or the notification server 230 as being initiated. Logs of activity are recorded. Changes in these values using the failsafe PID value would tend to indicate that such changes may be made under duress, resulting in "normal" appearing changes or even deactivation of the system at the Subject device level, but activating alarms at the server level to enable system personnel to react accordingly.

The map field 432 can be used to show the current location of the Subject, a boundary (or route) along which the Subject is to be located during the session, and so on. It will be recalled that the Subject device is in regular periodic communication with the server(s) during the session so that data exchanges take place between the respective devices as required. Such monitoring will generally continue until such time that the Subject logs out of the system, which as noted above requires entry of the normal PID value.

In some cases, the session can be tailored to have numerous check-in times specified at the time that the session is initiated. For example and not by limitation, the Subject (or other party) can initiate the session to have an overall duration (say, e.g., four hours) with scheduled check-in times at certain intervals (say, e.g., every hour). Multiple timers may be initiated at the remote server to handle both response intervals, or the response interval may be broken up into four consecutive, one hour sessions. A notice can be supplied to the Subject device in a short period leading up to the next scheduled check-in period (for example, one minute prior, etc.), and the Subject can check in by accessing the App and entering the normal PID value, thereby resetting the system for the next interval.

While it is contemplated that the PID value is entered using a keypad, such is not limiting. In other embodiments, the PID value can be entered using other mechanisms including voice activated systems. The PID value can be used to log into and initiate the system, although such is not necessarily required; in further embodiments, merely opening the Subject app can be sufficient to enable commencement of a given session. It will be appreciated that, in order to ensure no duress is present, check-in confirmations and closing (logging out) of the at app at the Subject device level normally require use of the normal PID value. In more complex systems, different PID values can be required for different check-in intervals and/or login/logout functions, as desired.

As noted above, the use of a PID value is contemplated but not necessarily required. Other entry mechanisms, including biometric inputs, can be utilized, provided the arrangement is designed to distinguish between a "normal" check in and a "failsafe" check in. In one embodiment, use of a first selected digit (e.g., right index finger) might be used to indicate a normal check in event, while use of a second selected digit (e.g., left index finger) might to used as a failsafe in a duress situation.

Figure 5:
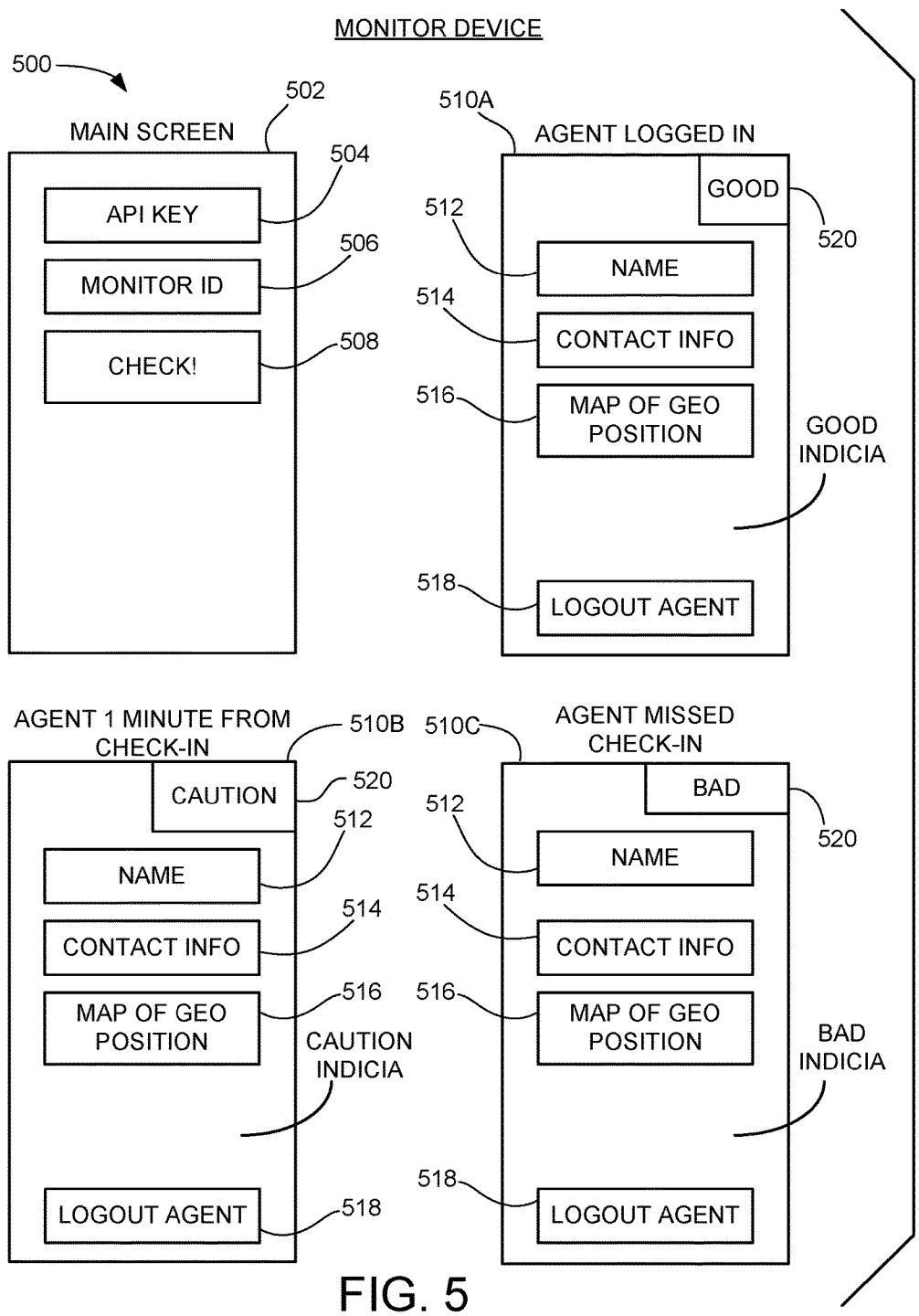
FIG. 5 provides a functional block diagram of a Monitor app in accordance with various embodiments of the present disclosure.

FIG. 5 shows various screen displays 500 that can be displayed on the Monitor device (e.g., NAD 112 in FIG. 1). It is contemplated for the present discussion that the Monitor device is also a handheld portable device (e.g., a smart phone, etc.) but such is not necessarily required. The format and information shown can be tailored depending on the requirements of a given operational environment. The information results from execution of the associated Monitor app loaded to and executed by the Monitor device.

A main screen on the device is generally represented at 502 and displays various information fields including an API key field 504, a monitor ID field 506 and a check field 508. While information pertaining to only a single Subject is shown, the app can be arranged to show information associated with multiple simultaneously monitored subjects as required. The API key field can be used to identify and manage the API keys that provide access and identification of the Monitor to the system. The monitor ID field 506 provides log in or other access capabilities for the Monitor to set up monitor functions. The check ("Check!") field 508 enables the Monitor to check on the status of the monitored subject(s) as required.

A status screen is represented at 510A for a selected subject, such as the Subject operating the Subject app as discussed above in FIG. 4. Various fields are supplied including name 512, contact information 514, map 516, agent (Subject) logout 518 and status 520. It will be apparent that these fields pertain to the status of the agent being monitored. Selection of these fields can allow the Monitor to view further information, such as a map of the geopositions of the Subject during the monitored session. The logout agent field 518, when utilized, allows the Monitor to log the Subject out of the system, thereby ending a monitored session.

The status field 520 shows a current status of the session. The term "Good" as indicated in FIG. 5 indicates that all parameters indicate normal and that the ongoing session is still in place (e.g., "good indicia" are present). Other fields can be used as well as desired, including timer information, etc. Color indicia can be used, such as a green color in certain locations (such as field 520 or the background color of the screen) to signify the overall status at a glance.

Screen 510B is similar to screen 510A and shows the same fields, except under certain circumstances that may require intervention by the Monitor. In this case, the situation is that the agent (Subject) is due to provide a periodic check in within a short period of time (e.g., within the next minute). A "Caution" status (field 520) signifies this condition, and may be represented by a different color such as yellow being displayed.

Screen 510C is similar to screens 510A and 510B but signifies a "Bad" condition based on the fact that the agent (Subject) has missed a scheduled check in. This is signified including by field 520 ("Bad"), as well as other suitable indicia such as red color. Other issues such as a vibratory response, an audible alarm, etc. may be activated as a result of this condition. As discussed herein, the Monitor may take steps at this point to contact the Subject by sending a message (e.g., phone call, text message, etc.) to the Subject device as a result of this condition.

It will be noted based on the foregoing discussion that the various information supplied to the Monitor app is provided by the operation of the countdown and notification servers 220, 230 (see FIG. 2). The level of monitoring supplied to the Monitor device can vary depending on the requirements of the application. In some cases, the Monitor device is little more than a passive receiver that is only notified if exception conditions occur; in other words, if all scheduled check-in operations by the Subject take place and no exception conditions are detected, then the Monitor device may receive no notifications at all.

It is not even necessarily required that the Monitor access and look at the information supplied by the App; notifications may be supplied, for example, using a vibratory or audible tone only in the case where a check-in interval is approaching or has been missed. In this way, the Monitor device can operate in a manner similar to the way that home security systems are sometimes operated; a monitoring service may or may not be specifically aware that a particular alarm system has been armed, but is ready to receive notifications should an exception condition occur (e.g., the alarm is triggered).

One feature of note that is present with the Monitor app is the fact that, while the Monitor can in at least some cases operate to logout the session for the associated Subject, as provided by the logout agent field 518, such logout operations do not halt all data tracking. Rather, in some embodiments the Subject app will continue to transmit data such as geo position data to the remote server(s), and other data such as the device responsible for logging out the session are recorded at the server level. Such geo position tracking can continue until the Subject next activates the Subject app. In this way, if anyone other than the Subject logs out a session, geo position information is automatically tracked and logged for future reference at the remote server level.

Figure 6A:
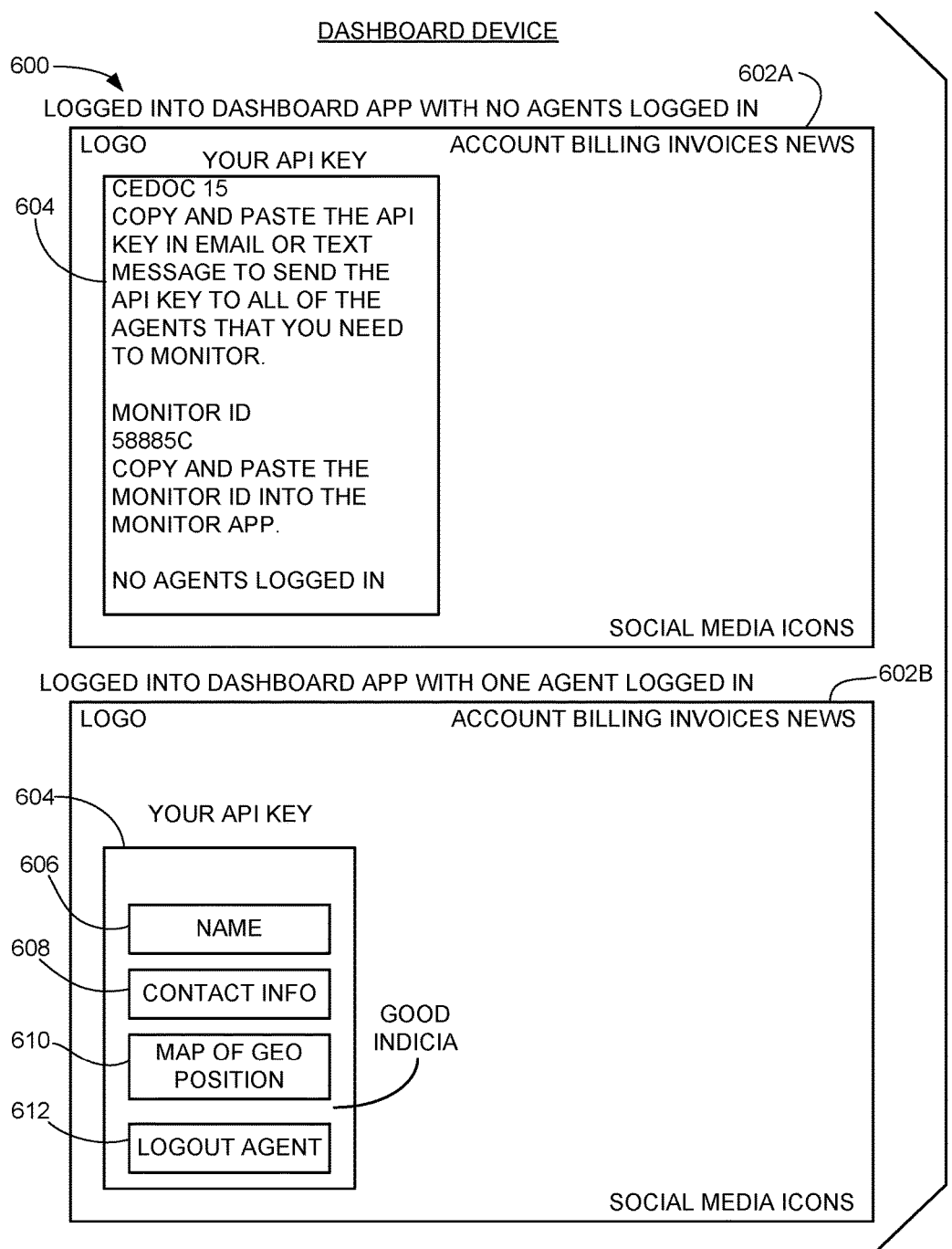
FIGS. 6A and 6B provide a functional block diagram of a Dashboard app in accordance with various embodiments of the present disclosure.
Figure 6B:
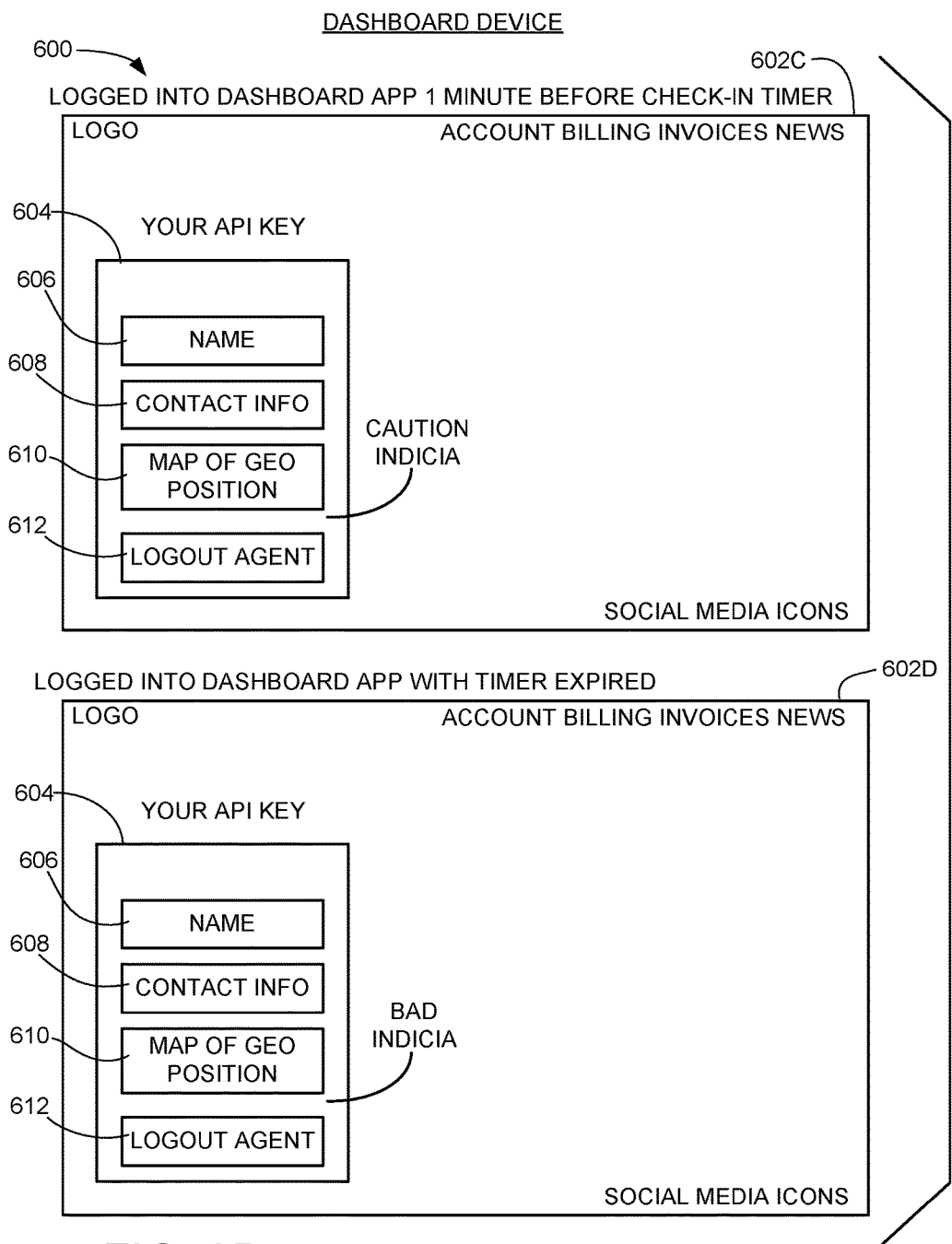

FIGS. 6A and 6B show various screens 600 depicted on a dashboard device. The dashboard device can be any suitable network accessible device, including but not limited to the Subject and/or Monitor devices, or another device. The screens depicted in FIGS. 6A and 6B are contemplated as comprising a monitor display for a desktop or laptop computer, although such is merely exemplary and is not limiting. It is contemplated that the screens are web pages served by the dashboard server 240 (FIG. 2).

Generally, the dashboard can be used to provide overall status of the system, including information for multiple simultaneously monitored Subjects. In some cases, the information supplied on the dashboard is the same as, or similar to, the information supplied to the Monitor device(s), but the information is supplied in a web browser (web page) format. Multiple subjects can be tracked. Other information can be displayed on the web page as well, such as news feeds, social media information, etc.

The figures show a sequence of screens, starting with screen 602A which provides a message field 604 associated with a particular API key. In screen 602A, no agents (Subjects) are logged into the session. In some cases, sample text such as displayed in FIG. 6A can be provided to enable the linking of a particular subject. In some embodiments, the logging in of a linked subject (via the API key) will automatically change the format of the screen to that shown at 602B, with various fields including name 606, contact information 608, map 610 and logout agent 612. It will be noted that these fields are similar to those provided for the Monitor device of FIG. 5. Status information can also be displayed, such as but not limited to the background color of the message field 604.

FIG. 6B shows the dashboard device with a third screen 602C having the message field 604 indicating caution indicia, indicating a caution situation such as, for example, a warning that the Subject is about to check in to the system. A fourth screen 602D shows a timer expired situation ("Bad Indicia") with the agent (Subject) having missed the required check in time. It will be noted that the dashboard can provide web based access to the monitoring functions set forth in FIG. 5, with one difference being that the user of the dashboard required to access a different device, such as a cell phone, to check in with the Subject as a result of having missed the scheduled check-in as indicated by screen 602D.

Hardware Overview

Having now reviewed various exemplary GUI formats that may be implemented by the system in accordance with various embodiments, the present discussion will turn to additional aspects of the various embodiments at a module level. It will be appreciated that the system as described herein can be implemented by the skilled artisan across a number of commercially available platforms and environments, so that the following discussion is merely for purposes of expanding the present discussion and is not limiting to the scope of the claimed subject matter.

Figure 7:
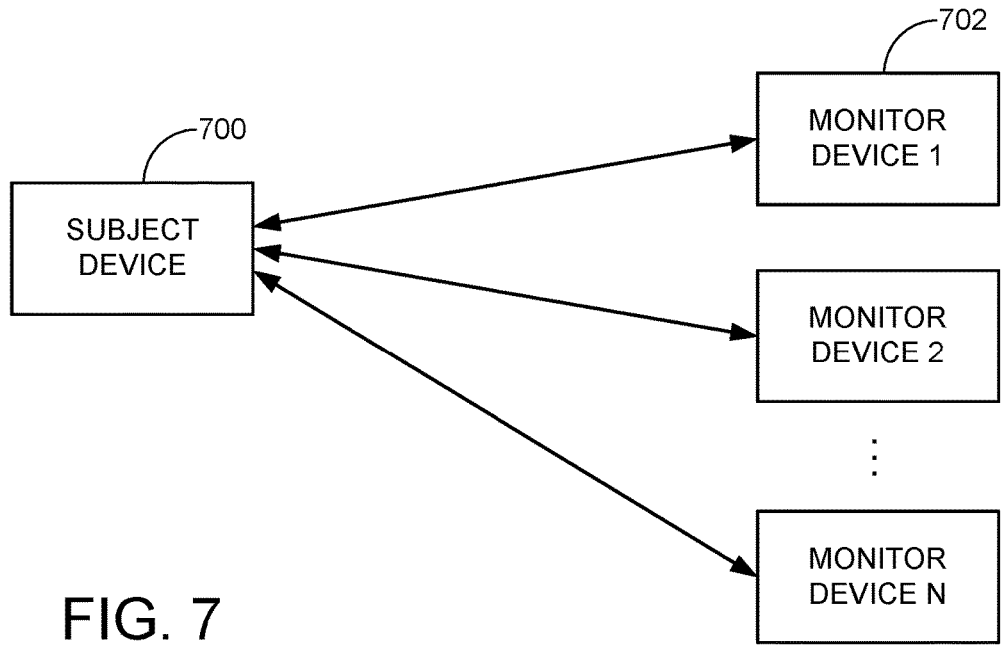
FIG. 7 shows a subject device in communication with multiple monitor devices in accordance with some embodiments.

FIG. 7 shows a Subject device 700 in communication with a plural number N of Monitor devices 702. In some cases, an enterprise model can be utilized so that a central monitor (or monitors) can be identified and used to provide monitoring functions. In other cases, a consumer model can be utilized so that the Subject can invite any number of individuals (e.g., friends and family members) to be monitors for the Subject. While the associated remote servers are not shown (e.g., the countdown, notification and dashboard servers of FIG. 2), it will be appreciated that communications between the respective devices in FIG. 7 are moderated via such servers. Such is contemplated but not necessarily required.

Any number of monitoring devices can be selected for use in a given session. For example and not by way of limitation, the Subject can, via the associated device, send out electronic invitations to Monitors (e.g, friends and/or family members) for a given session so that, during the elapsed period of time of the session, such members serve as Monitors and can respond, as required, should an exception condition arise. Updates of status regarding the Subject are pushed to the Monitor devices 702 via the notification server (such as 230 in FIG. 2) in any suitable form.

In one embodiment, the Subject device 700 can notify the server(s) of the telephone numbers or other identifying indicia for the Monitors and the notification server can push notifications, including in the form of text messages, to the Monitor devices in the event that exception conditions arise. In this way, concerned individuals (e.g., the owners of the Monitor devices 702) can attempt to contact the Subject in the event of a missed check-in or other event and, as necessary, initiate an investigation activity that can include contacting the appropriate authorities.

Figure 8:
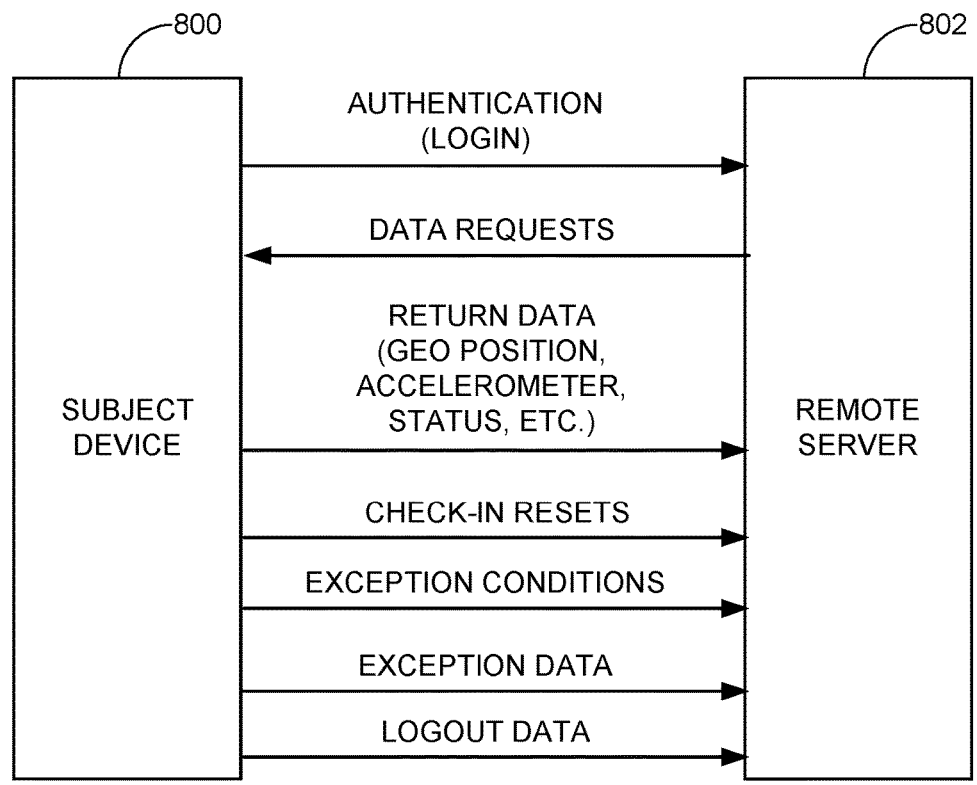
FIG. 8 shows a data exchange between a subject device and a remote server.

FIG. 8 shows an exemplary information exchange that can occur between a subject device 800 and a remote server 802 during a given monitored session as discussed herein. Such data exchanges can include wireless transmissions over a suitable network as discussed above. The remote server 802 can correspond to the countdown server 220, notification server 230, or other servers of the system as required.

The data exchanges include an authentication sequence that is initiated during the initial login by the Subject. This can include simply opening the Subject app at the subject device level, or more intricate operations including the entry of one or more values (including the PID value) and the setting of various system parameters including duration of the session, scheduled check-in times, etc. If the session is set up automatically by the opening of the Subject app, preselected parameters can be employed. In some cases, the system can be configured such that a voice command, such as a command to initiate the Subject app, can be sufficient to initiate the session.

During the elapsed time interval established by the session, various data requests will be issued by the remote server 802. These data requests can be issued on a periodic basis, such as at the end of every selected interval (e.g., every 30 seconds, etc.). In response, the subject device 800 supplies return data to the remote server 802, such as but not limited to geo position data associated with the latest geo position of the device, accelerometer data indicative of a multi-dimensional acceleration state of the device 800, status data associated with the device including but not limited to time and date stamp data, battery level data, signal level data, logged data, etc.

It is not necessarily required that data requests be issued to the subject device 800; in other embodiments the subject device pushes return data to the server 802 on a periodic basis without the need for the request of the data being submitted to the device.

As further shown in FIG. 8, additional data communications can flow between the subject device 800 and the server 802 including check-in resets that are periodically issued to the remote server 802 in the manner discussed above. Such resets may include the entry by the Subject of the associated normal PID value to indicate that normal processing status is in place at the appropriate times.

Additional data can be conveyed to the remote server 802 including exception conditions that can be transmitted to the server based on various criteria. For example, the pushing of a panic button at the subject device can result in a signal being sent to the remote server based on the Subject not being comfortable with the current situation. Other exception conditions can include movement of the Subject device 800 outside a predefined zone around a base location (e.g., more than 500 feet from an initialized area, such as a house being shown), a sudden increase in accelerometer readings (which might arise from simply dropping the device 800 or because the Subject was physically accosted, etc), and so on.

In some cases, efforts to tamper with the Subject app, such as an effort to disable or uninstall the Subject app, are reported to the remote server as an exception condition.

Such reporting can take place either during a monitored time period or at other times including when a monitored period has not been recently scheduled. In such cases, confirmation can be made with the Subject before allowing the app to be removed, including use of the normal PID value or a special PID value designed for that purpose. As before, failure to successfully authenticate the removal of the app will result in data logging and notifications.

These and other exception conditions, once reported, result in the notification server operating to send alerts to the various monitors and other dashboard observers, who can then take various actions to attempt to contact the Subject and resolve the situation. If not, further steps can be taken (such as no Monitor checking back within an allotted time frame with an "all clear" signal) and appropriate authorities, such as police, fire, ambulance, etc. can be dispatched to investigate the situation and ensure the safety of the Subject.

Exception data represents actual data that are transmitted to the remote server under exception conditions. One example is the entry of a failsafe PID value, which would tend to indicate that the Subject is under duress (e.g., the person may be in a situation where an assailant is forcing the Subject to enter an "all clear" code, etc.). Under these circumstances, an immediate call to local authorities may be made by the system in order to come to the assistance of the Subject.

Finally, FIG. 8 shows the entry of logout data supplied by the Subject device 800 to the remote server 802 at the conclusion of a given session. Entry of the appropriate PID value by the Subject on the Subject device concludes a given monitored session.

Figure 9:
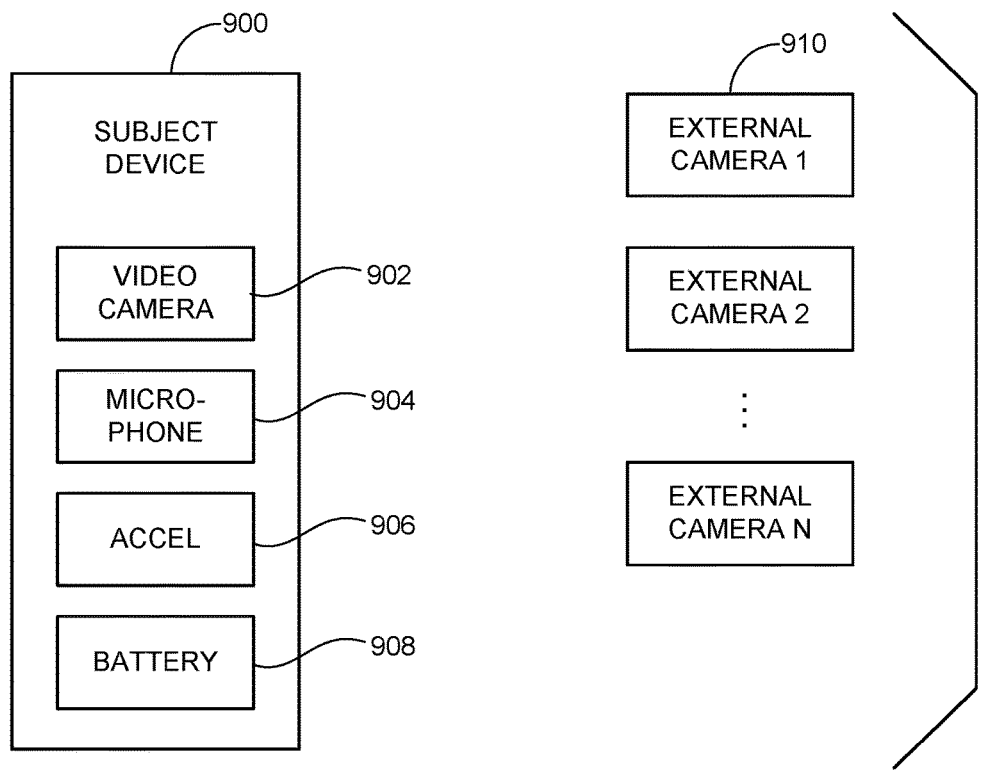
FIG. 9 is a representation of a subject device in combination with various external cameras that are activated responsive to an exception condition associated with the subject device.

FIG. 9 provides another functional block representation of a Subject network accessible device 900 configured as discussed herein. The device 900 includes a number of operative features including a video camera 902, a microphone 904, an accelerometer system (accel) 906 and a battery 908. The video camera 902 is configured to take still shots (pictures) or a sequence of pictures at an appropriate frame rate to constitute video data. The microphone 904 is adapted to detect and record audio information in the vicinity of the device 900. The accelerometer system 906 is adapted to detect changes in acceleration level along multiple (e.g., X, Y and Z) axes. The battery supplies electrical power for use by the device 900.

In further embodiments, should an exception condition be detected based on various predetermined criteria, various elements in FIG. 9 may automatically operate under the control of the Subject app. For example, should an agent (Subject) fail to check in at an appropriate check-in time, or the Subject enters the failsafe PID value, the video camera 902 and the microphone may be automatically activated to capture and relay video and audio data to the remote server for logging and future reference. Similarly, upon detection by the accelerometer system of an abnormal acceleration state, the video camera and the microphone may be activated to capture and stream video and audio data to the remote server.

Should the battery run out of charge so that the device 900 becomes deactivated, such operation will be detected by the system at least from the standpoint of the device 900 no longer being responsive to the data requests discussed in FIG. 8. If the cause of the deactivated power is merely the running out of power by the device due to inadvertent lack of charging of the device, emergency personnel may be dispatched but the result will be the happy outcome that the agent is safe and sound. On the other hand, should power be lost based on the fact that an assailant has removed the battery or otherwise disabled the system, the dispatching of emergency personnel may result in the rescue of the Subject from a dangerous situation.

In still further embodiments, as disclosed in FIG. 9, one or more external cameras 910 such as cameras 1 through N at or near the geo position of the Subject may be automatically activated as a result of the detection of an exception condition. The cameras may be wireless cameras adapted to operate in fully operational or standby mode, and stream video and/or audio data back to the remote server(s) upon detection of a triggering condition. The cameras may be linked wirelessly to the Subject device 900 or to a separate module (not separately shown) so that video and/or audio data captured by the cameras are uploaded to the remote server(s).

Figure 10:
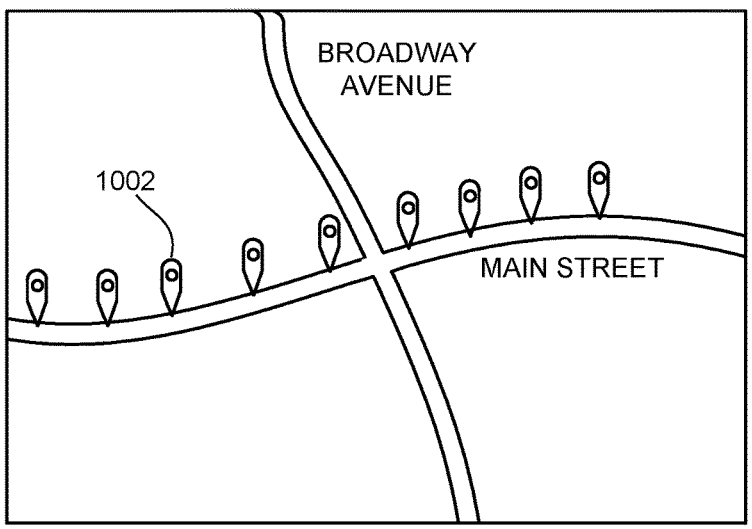
FIG. 10 represents map data accumulated by the system in accordance with various embodiments.

FIG. 10 provides map data 1000 such as the type that may be displayed on the various Subject or Monitor devices or the Dashboard discussed above. The map data 1000 provides a graphical representation of the geo positions of the Subject device during the monitored period. As can be seen, position indicia 1002 can be used to denote the detected position of the device at different times over the applicable period. Such data can be logged and used during subsequent tracking operations to locate the Subject. In some embodiments, the geo position of the Subject during the monitored session is not stationary but instead is intended to move over time. In such case, the tracking shown in FIG. 10 can be used and compared to a desired travel profile, with deviations being used to signal exception conditions.

As noted above, should a given session be terminated by anyone other than the Subject using the Subject app, geo position tracking information such as represented in FIG. 10 will be collected and stored in memory by the remote servers from the Subject device until such time that the Subject reinitializes the next session on the Subject device. Such data will be stored in the remote servers. Other forms of data may be collected as well (e.g., audio data, video data, accelerometer data, etc) and transmitted as long as the Subject device remains operable. It will be recalled that such data will continue to be transmitted even if the Subject app appears to be closed on the Subject device.

The various embodiments discussed above have generally operated to have the remote server set and track the overall duration of a given monitored session (e.g., a four hour session with one hour check-in intervals, etc.). While operable, this is not necessarily required. In further embodiments, the overall duration of a given monitored session can be established at the Subject device (or other device such as the Monitor device) with the remote server using shorter elapsed intervals to wait for communications from the Subject device. As before, a timer is still set remotely at the remote server level and a notification is still generated at the conclusion of each interval. Moreover, failure of the Subject device to check in during said intervals still result in the generation of one or more notifications.

It will be appreciated that the various tracking functions are implemented on an opt-in basis and that information regarding the location of the Subject via the Subject device are not logged or recorded without consent of the Subject or a duly recognized authority.

While various embodiments have been directed to the use of the system in the context of a commercial agent, such as a real estate agent, it will be appreciated that such is merely exemplary and is not limiting. Other applications will readily occur to the skilled artisan in view of the present disclosure. In one example, an elderly parent may be continuously or semi-continuously monitored with scheduled check in times required throughout each day. In another example, a teenage child may be monitored at a certain location or along a selected route as the child drives to a particular destination. Military and/or government applications may include the monitoring of military and civilian personnel in a war zone or other dangerous environments (e.g., embassy or consulate staff in a foreign country), and so on.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A system comprising:
   a lockbox configured to be affixed adjacent a real estate property, the lockbox configured to store a key accessible by a real estate agent to facilitate authorized access to the real estate property, the lockbox further comprising a transmitter and a receiver;
   a first network accessible device comprising a programmable processor circuit and a memory that stores a subject application (app) as a sequence of program instructions executable by the programmable processor circuit, the subject app configured to initiate a monitored session associated with the real estate agent responsive to detection, by the receiver of the lockbox, of a proximity of the first network accessible device, the subject app further configured to enable the subject to identify a selected monitored time interval of the monitored session from among a population of different available monitored time intervals for the predefined zone responsive to an assessment of the predefined zone by the subject;
   a remote server coupled to the first network accessible device by a network and configured to initiate a countdown timer circuit responsive to receipt, via the network, of the selected monitored time interval from the subject app, the countdown timer initiated responsive to interaction between the real estate agent and the subject app; and
   a second network accessible device of a monitor associated with the subject and configured to receive, from the remote server, a notification responsive to a conclusion of the selected monitored time interval as indicated by the countdown timer circuit, the second network accessible device configured to trigger an alarm indicative of the subject potentially being under duress responsive to the notification from the remote server that the selected monitored time interval has concluded without an intervening authorized input by the subject prior to the conclusion of the monitored time interval.

2. The system of claim 1, wherein the second network accessible device comprises a programmable processor circuit and a memory that stores a monitor app as a sequence of program instructions executable by the programmable processor circuit, the monitor app configured to transmit a status request, via the network, to the first network accessible device responsive to the notification from the remote server.

3. The system of claim 1, wherein the remote server is further configured to receive updated geo position data associated with different geo positions of the first network accessible device during the monitored session, and to transmit a second notification to the second network accessible device of the monitor, indicating that a detected geo position of the first network accessible device is outside the predefined zone during the monitored session.

4. The system of claim 1, further comprising a biometric circuit associated with the first network accessible device configured to transmit biometric input data associated with a biometric state of the real estate agent subject to the subject app for transfer, via the network, to the remote server.

5. The system of claim 1, wherein the monitored session is initiated by logging into the subject app responsive to detection of a geo position of the first network accessible device passing into the predefined zone through communication between the first network accessible device and the stationary device, the predefined zone characterized as a stationary zone that surrounds and encompasses the selected geo position.

6. The system of claim 1, wherein the real estate agent pre-selects a duration of the monitored time interval and the monitored time interval is automatically initiated responsive to the real estate agent coming into proximity of the lockbox to access the key stored therein.

7. The system of claim 1, wherein the alarm is further configured to be activated responsive to entry, by the subject into the first network accessible device, of a failsafe personal identification (PID) value configured to indicate, on a display of the first network accessible device, a resetting of the monitored time interval prior to a conclusion of the monitored time interval.

8. A computer implemented method, comprising:
   logging in, through executing a subject application (app) on a network accessible device, a geo position of a subject in preparation of initiating a monitored session associated with the subject;
   bringing the network accessible device into proximity of a lockbox of a real estate property, the lockbox storing a key to facilitate authorized access to the real estate property, the lockbox further comprising a transmitter and a receiver;
   using the receiver of the lockbox to detect a presence of the network accessible device;
   using the transmitter of the lockbox to forward an initiation signal to the network accessible device responsive to the detected presence of the network accessible device;
   initiating a countdown timer of a remote server in communication with the network accessible device over a network responsive to the logging in of the subject to denote a monitored time interval of the monitored session and in response to receipt of the initiation signal from the transmitter of the lockbox;
   transmitting a notification, from the remote server to a second network accessible device of a monitor associated with the monitored session, responsive to a conclusion of the selected monitored time interval indicated by the countdown timer circuit; and
   activating an alarm indicative of the subject potentially being under duress responsive to the notification from the remote server to the second network accessible device.

9. The method of claim 8, further comprising selecting, by the subject using the subject app, a selected monitored time interval of the monitored session from among a population of different available monitored time intervals for the predefined zone responsive to an assessment of the predefined zone by the subject.

10. The method of claim 8, further comprising:
identifying a predefined zone that encompasses the geo position of the subject; and
using the subject app to initiate the monitored session associated with the subject responsive to the network accessible device being within the predefined zone.

\* \* \* \* \*